June 14, 1927.
T. W. STONE
1,632,251
GAS PURIFYING APPARATUS
Filed Feb. 16, 1922
5 Sheets-Sheet 1
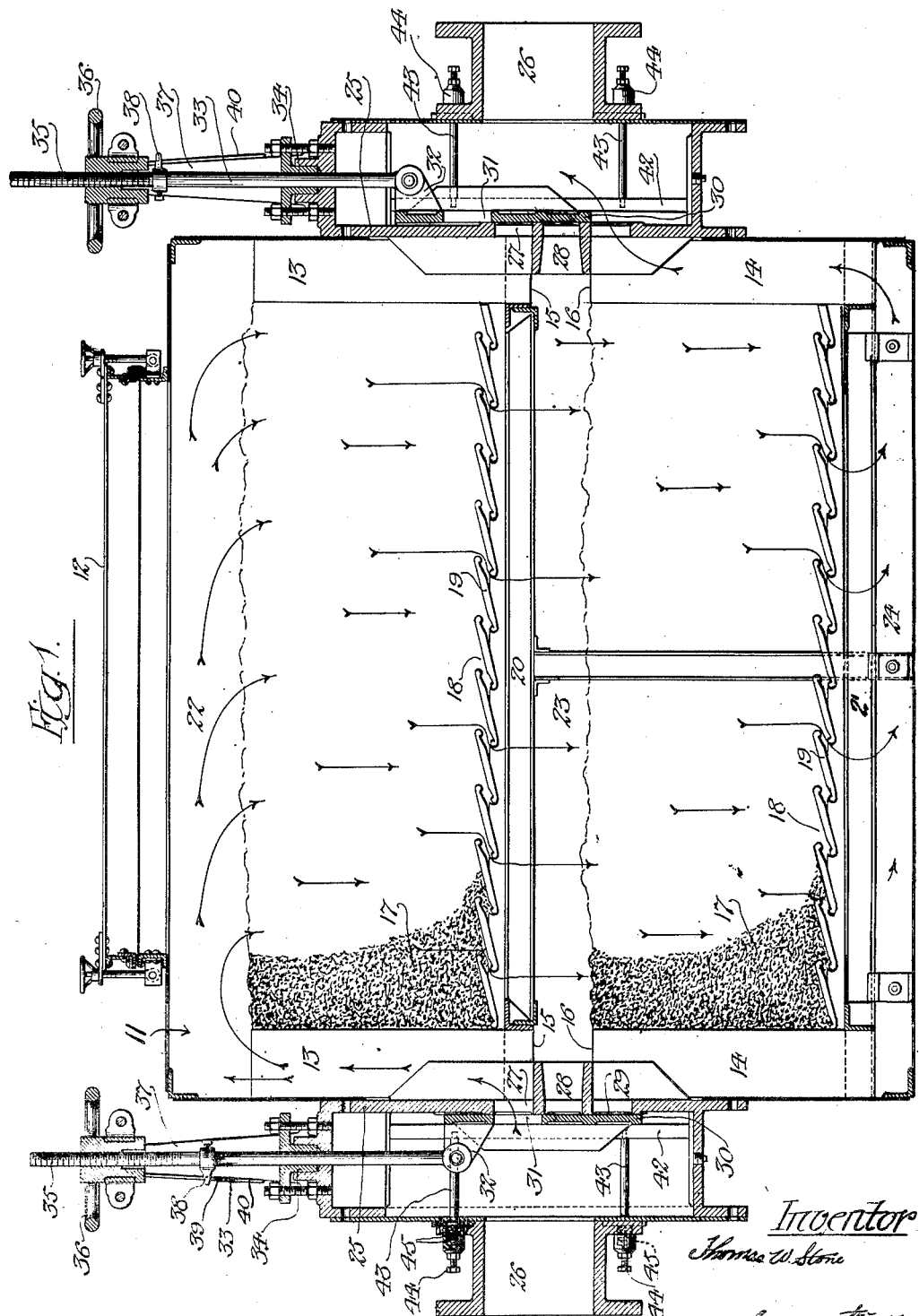

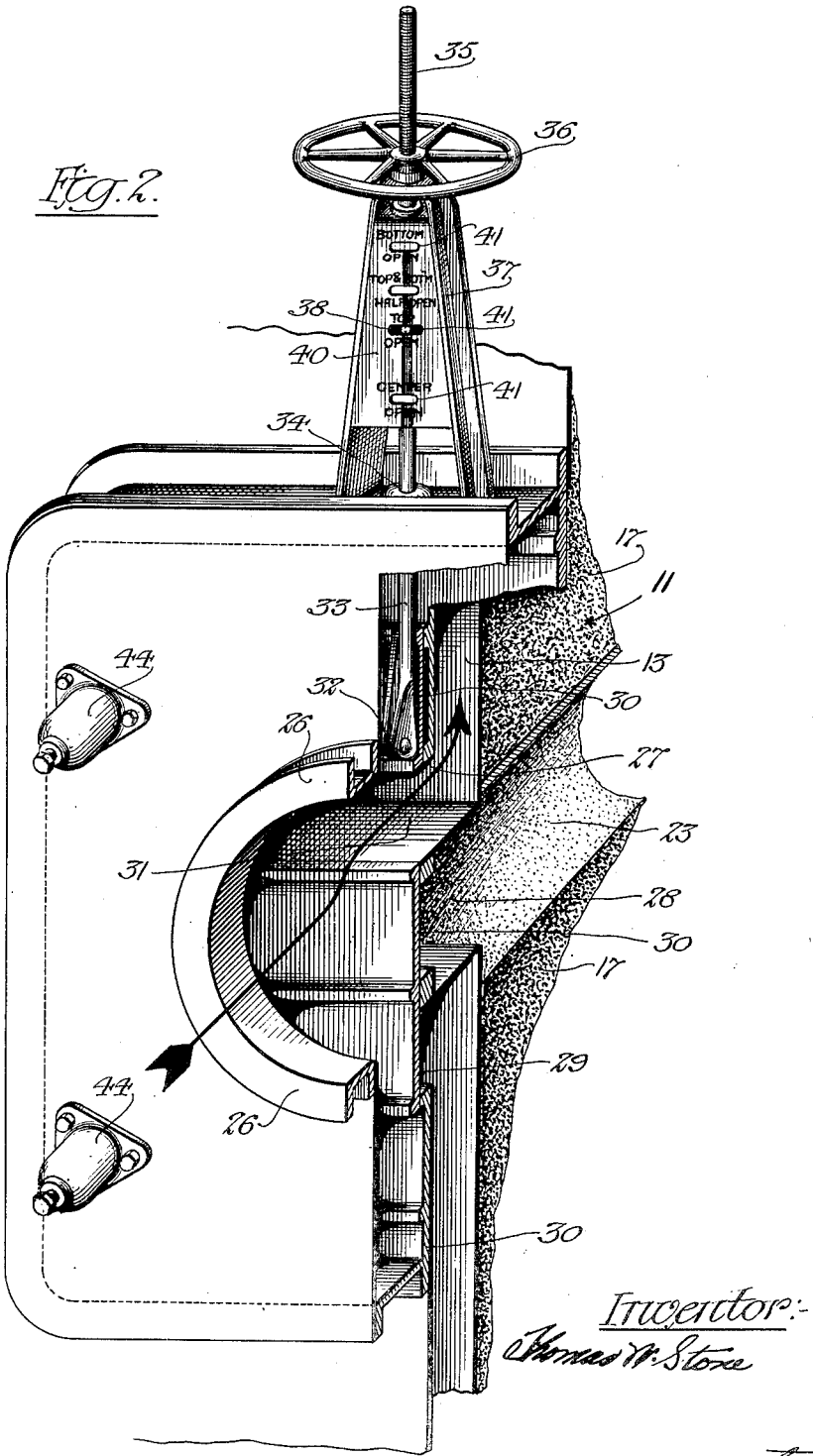

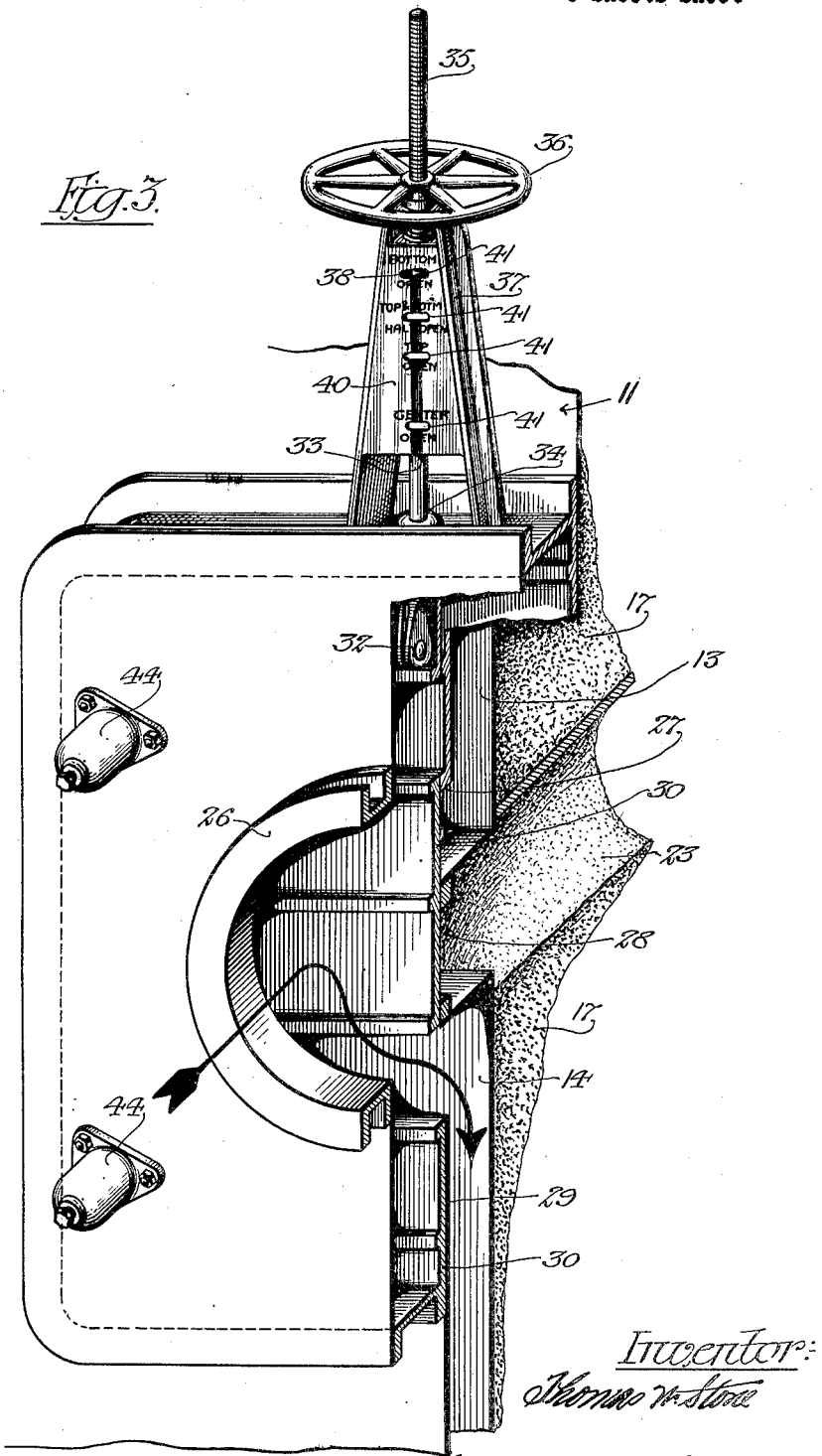

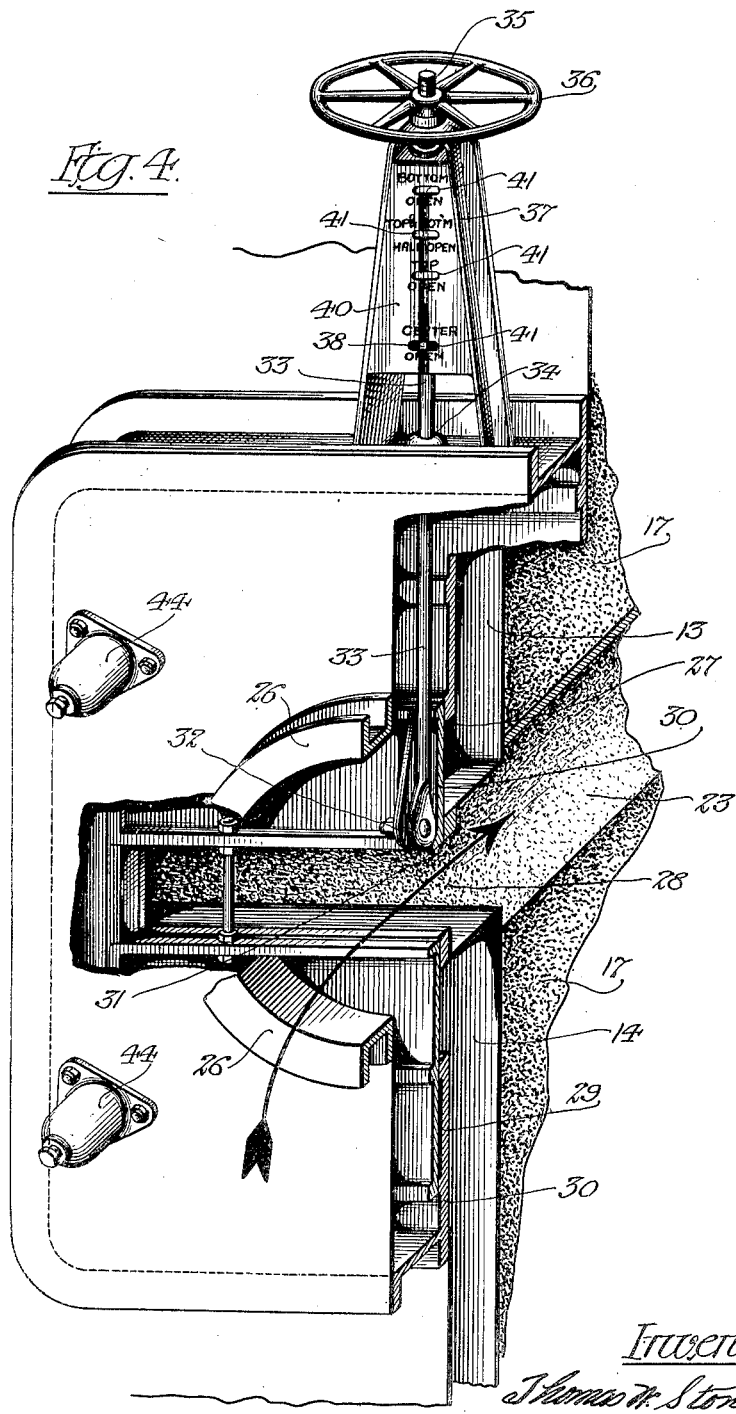

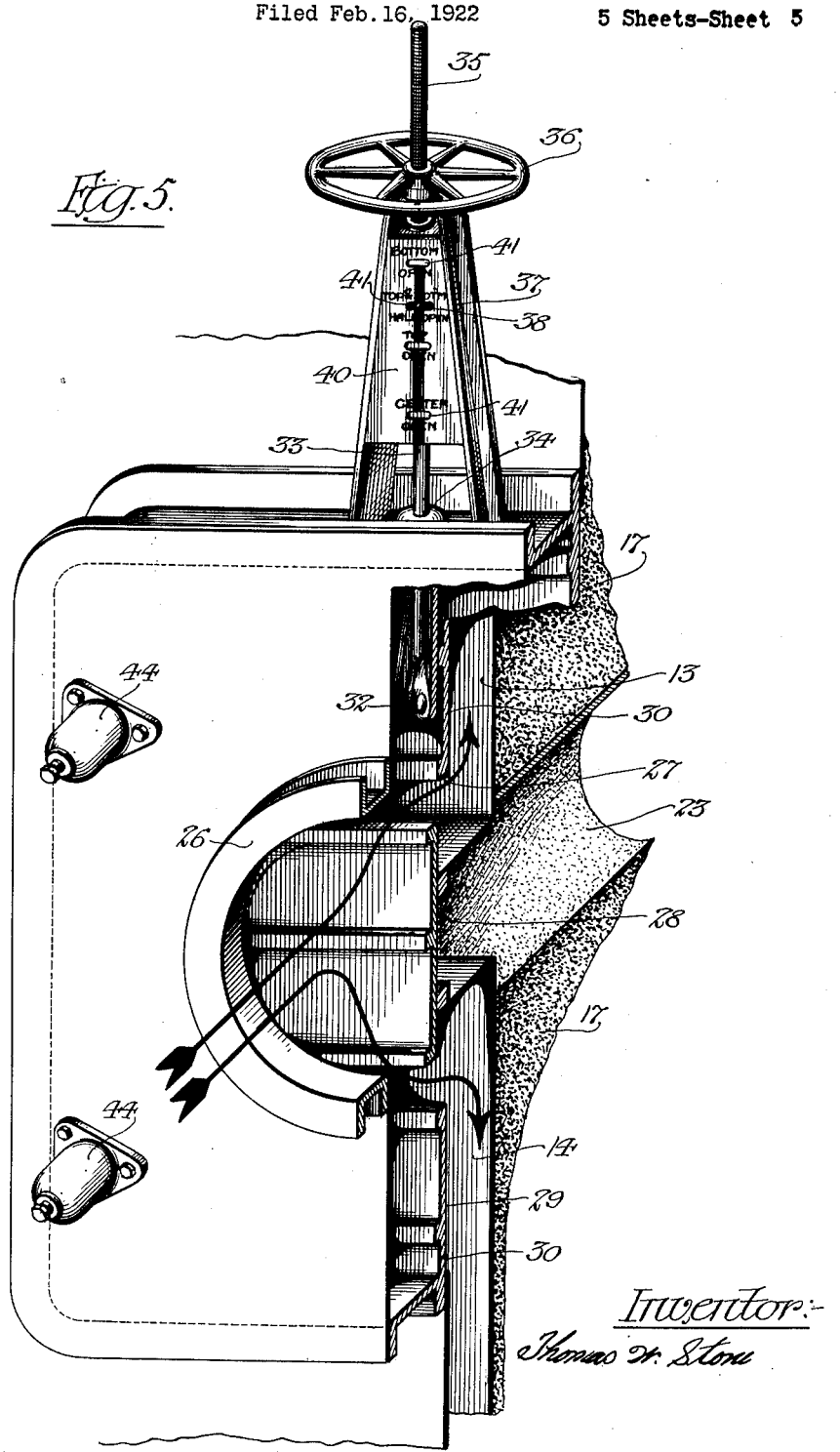

Patented June 14, 1927.

1,632,251

UNITED STATES PATENT OFFICE.

THOMAS W. STONE, OF FORT WAYNE, INDIANA, ASSIGNOR TO WESTERN GAS CONSTRUCTION COMPANY, OF FORT WAYNE, INDIANA, A CORPORATION OF INDIANA.

GAS-PURIFYING APPARATUS.

Application filed February 16, 1922. Serial No. 536,882.

This invention relates to purifying boxes for gases, such, for example, as are employed for removing the sulphur impurities in fuel gases by causing the gas which enters the purifying box to circulate through a mass of iron oxide. The invention has for an essential object to provide an improved and efficient purifying box, having provision for regulating and controlling the flow of the gas through the purifying agent contained within the box in such manner that the gas may be required, at the will of the operator, to flow either in one or in a reverse direction through the mass of purifying agent, pursuant to operation of a flow regulating means, with the result that the gas may be passed first through one portion and subsequently through another portion of the purifying agent and different portions of the purifying agent are, in turn, exposed to the action of the impure gas which first enters the box. With this arrangement, that portion of the purifying agent which has become foul or spent, by reason of encountering the impure gas may be caused, by a change of direction of flow of the gas through the box, to encounter the relatively pure gas, after the gas has been stripped of most of its sulphur impurities by previous passage through a fresh portion of the purifying agent. Inasmuch as fuel gases contain oxygen in varying amounts, the change of direction of flow of the gas provided by the invention, is effective to revivify the spent purifying agent, thereby greatly prolonging the effective life of the purifying agent in the box and decreasing the frequency of the difficult and expensive replenishing operations.

In addition to the general objects recited above, the invention has for further objects such other improvements and advantages in construction and operation as are found to obtain in the structures and devices hereinafter described or claimed.

In the accompanying drawings forming a part of this specification and showing, for purposes of exemplification, a preferred form and manner in which the invention may be embodied and practiced, but without limiting the claimed invention specifically to such illustrative instance or instances:

Figure 1 is a longitudinal vertical sectional elevation of a gas purifying box equipped with the improvements of the present invention; and Figs. 2, 3, 4, and 5 are sectional and perspective views of the flow regulating means and respectively showing adjustments for different directions of flow of the gas through the purifying box.

The same characters of reference designate the same parts in each of the several views of the drawings.

In the illustrated embodiment of the invention, the improved gas purifying box is constructed especially for use as an iron oxide box for removing the sulphur constituents, principally hydrogen sulphide, from fuel gases. For convenience, the present description will be confined to this use of the invention. Features of the improved mechanism of the invention are, however, capable of other valuable applications; consequently, the scope of the invention is not confined to the specific use and specific embodiment herein described as an illustrative example.

Referring to the drawings: there is shown at 11 a gas purifying box or compartment, provided with a removable cover 12 for permitting access to the interior of the box, when replenishing the supply of purifying agent. Formed by suitable panelling at the opposite ends of the box 11 are upper and lower gas flow passages or channels 13 and 14, the upper gas flow channels 13 being respectively closed at their bottoms, at 15, but open at their tops, and the lower gas flow channels 14 being respectively closed at their tops at 16 but open at their bottoms. The gas purifying agent, such as the usual mass of iron oxide designated generally by the reference character 17 is supported in upper and lower tiers between the upper and lower pairs of gas flow channels 13 and 14. Each tier of the purifying agent is supported upon a grate 18, composed generally of inclined slots 19 affording passages for the flow of the gas. The grate 18 of the upper tier is carried by a frame 20 which extends between the bottom portions of the upper pairs of gas channels 13, and the grate 18 of the lower tier is supported by a similar horizontal frame 21 that extends between the bottom portions of the lower pair of gas flow channels 14.

As shown, the tops of the upper gas flow channels 13 are located some distance below the roof of the purifying box; the tops of the lower gas flow channels 14 are located some distance below the bottoms of the upper channels 13 and the supporting frame 20 of the upper tier of iron oxide; and the bottoms of the lower gas flow channels 14 and the supporting frame 21 for the lower tier of iron oxide are positioned some distance above the bottom of the purifying box. In practice, the upper and lower tiers will be filled with purifying agent only to about the level of the tops of the upper pair of gas flow channels 13 and the lower pair of gas flow channels 14. The above described construction and arrangement provide an upper horizontal passageway 22 for the gas flow, an intermediate horizontal gas flow passageway 23 and a bottom horizontal passageway 24.

The invention provides a flow regulating mechanism whereby the gas passing through the purifying box may be directed either up or down through either or both tiers of the iron oxide contained within the purifying box, permitting the top and bottom layers of both tiers of the iron oxide to be exposed, at will, alternatively to the initial contact of the impure gas that first enters the purifying box. For example, should the bottom layer of the iron oxide become foul, in either tier, the flow of gas through that tier may be reversed to cause the gas to first enter the iron oxide from the top of the tier and pass out through the bottom, with the result that the top portion of the mass of iron oxide which is relatively pure is exposed to the action of the impure gas and the fouled bottom portion of the iron oxide is exposed to the gas only after it has been stripped of most of its sulphur. The relatively pure gas passing through the fouled iron oxide contains oxygen which acts to revivify the fouled oxide and render it available for further gas purification.

Mounted at the opposite ends of the purifying box 11 are valve mechanisms which, in the present instance, are duplicates of each other. Each valve mechanism comprises a valve casing 25 secured to an end of the purifying box 11 and provided with a connection 26 for coupling a gas line to the valve casing, whereby the gas line is in communication with the interior of the valve casing. The valve mechanism shown at the left hand end of the purifying box, illustrated in the drawing, may be utilized as the inlet valve mechanism and consequently is coupled with the gas line containing the impure gas passing to the purifying box: and the valve mechanism illustrated at the right hand side of the purifying box may be employed as the outlet valve mechanism for the purified gas from the box 11 and therefore is coupled with the outflow purified gas line. Each valve casing 25 communicates by a port 27 with the upper gas channel 13 at the same end of the purifying box, by a port 28 with the central horizontal gas passageway 23 between the upper and lower tiers of iron oxide, and by a port 29 with the lower gas flow channel 14. The flow through the ports 27, 28 and 29 on each valve casing 25 is controlled by a slide 30 bearing against the inner face of the inner way of the valve casing and mounted for vertical sliding movement within said casing. The slide 30 of each valve mechanism is provided with a port 31 and, at its upper end with an inwardly-extended lug 32 to which is secured the lower end of a vertical valve operating rod 33. Each rod 33 extends through a stuffing box 34 in the top of its respective valve casing and is provided at its upper end with a screw threaded portion 35, that extends through the screw threaded hub of a hand wheel 36 mounted on the top of an upright 37 supported on the valve casing. The slide 30 of either valve mechanism may be raised or lowered by the simple operation of turning its corresponding hand wheel 36.

Preferably, each valve mechanism is provided with an indicator for showing the position of its slide with respect to the ports 27, 28 and 29 in the valve casing. For this purpose there is secured to each rod 33 a pointer 38 which passes through a vertical slot 39 in an indicator plate 40 secured to the upright 37. As shown in Figs. 2 to 5 inclusive, the plate 40 is provided with different indicia 41, which co-operate, when the pointer 38 is in a corresponding position, to designate the position of the slide 30.

In order to insure a tight fit of the slide 30 against the inner wall of the valve casing and yet to prevent sticking of the slide, the slide of each valve mechanism is preferably operated against an adjustable spring tension. For this purpose vertical tension rods 42 bear against the outer faces of each slide 30 under the pressure of upper and lower pins 43. The pins 43 pass through the outer vertical wall of the valve casing into housings 44 that are respectively provided with springs 45 bearing on the outer ends of the pressure pins 43. The pressure of each pin may be adjusted to adjust the pressure of its corresponding pin 43, by means of a set screw carried by each housing. With this construction, the pressure of both the upper and lower ends of each rod 42 against the slide 30 may be accurately adjusted to insure accurate travel of the slide against the inner wall of its valve chamber.

In the operation of the hereinabove described flow regulating means, the valve mechanism at either end of the purifying box may be adjusted so that the gas flows only through the upper gas channels 13, as shown in Fig. 2 or only through the bottom gas flow channel 14, as shown in Fig. 3, or through the central horizontal gas passage 23, as shown in Fig. 4 or simultaneously through both the upper and lower channels 13 and 14, as shown in Fig. 5. When the gas enters through the upper channel 13 it passes to the top passage 22, and downwardly through both tiers, as shown in Fig. 1, and may be then drawn out through the bottom channel 14 and flow regulating mechanism at the outflow side of the purifying box. Or, the flow of gas may be reversed so that the impure gas enters from the bottom of the lower tier of iron oxide and is drawn out through the top of the upper tier. Again, the flow regulating mechanism may be adjusted so that the gas enters simultaneously the top and bottom of the upper and lower tiers and is drawn out through the central passageway 23. Or reversely, the inflowing impure gas may be first passed into the central passageway 23 and drawn out through the upper and lower passageways 22 and 24 that are respectively located at the top and bottom of the upper and lower tiers.

In the event that there is lack of uniformity between the two superposed tiers of purifying oxide when the tiers are filled, or lack of uniformity due to a preponderance of moisture or heavy deposit of tar present in one or the other of the tiers, there would necessarily result a greater amount of back pressure through one of the masses of purifying oxide. In order to compensate for this difference in pressure and to obtain a uniform and evenly divided flow of gas through both tiers when the gas is being admitted through the central port 28, it becomes desirable to adjust the valve so as to admit a greater amount of gas into the tier having the greatest amount of back pressure and a correspondingly smaller amount of gas into the tier of lesser density. It will be apparent from an inspection of Fig. 5 that the valve 30 may be adjusted as desired to admit these varying proportions of gases into the upper and lower gas flow passages 13 and 14. This will result in an equalization of the working load placed upon each of the tiers by admitting the greater proportion of gas into the tier having the greatest amount of back pressure therein.

The invention as hereinabove set forth is embodied in a particular form of construction but may be variousy embodied within the scope of the claims hereinafter made.

I claim:

1. In a gas purifying apparatus, in combination; a purifying box provided with upper and lower tiers for supporting masses of a gas purifying agent and providing a gas passageway above the upper tier, a gas passageway below the lower tier and an intermediate gas passageway between said tiers; upper and lower gas flow channels located at the opposite ends of said boxes, the upper channels communicating only with the upper gas flow passageway, and the lower channels communicating only with the lower gas flow passageway; a gas flow regulating means comprising a valve casing positioned at each end of the purifying box, each valve casing having ports respectively communicating with the upper gas flow channel, the intermediate gas flow passageway and the lower gas flow channel, a valve body yieldingly held in juxtaposition with said ports and movable into positions for selectively opening any one of said ports, or the upper and lower ports simultaneously, and manually-controlled means for operating said valve body; substantially as specified.

2. In a gas purifying apparatus, in combination: a purifying box provided with upper and lower tiers for supporting masses of a gas purifying agent and providing a gas passageway above the upper tier, a gas passageway below the lower tier and an intermediate gas passageway between said tiers; upper and lower gas flow channels located at the opposite ends of said boxes, the upper channels communicating only with the upper gas flow passageway and the lower channels communicating only with the lower gas flow passageway; a gas flow regulating means comprising a valve casing positioned at each end of the purifying box, each valve casing having ports respectively communicating with the upper gas flow channel, the intermediate gas flow passageway and the lower gas flow channel, a valve body movable into positions for selectively opening any one of said ports, or the upper and lower ports simultaneously, and manually-controlled means for operating said valve body; substantially as specified.

3. In a gas purifying apparatus, in combination; a purifying box provided with upper and lower tiers for supporting masses of a gas purifying agent and providing a gas passageway above the upper tier, a gas passageway below the lower tier and an intermediate gas passageway between said tiers; upper and lower gas flow channels located at the opposite ends of said boxes, the upper channels communicating only with the upper gas flow passageway and the lower channels communicating only with the lower gas flow passageway; a gas flow regulating means comprising a valve casing positioned at each end of the purifying box, each valve casing having ports respectively communicating with the upper gas flow channel, the intermediate gas flow passageway and the lower gas flow channel, a valve body for controlling the flow through said ports, and manually-controlled means for operating said valve body; substantially as specified.

4. In a gas purifying apparatus in combination: a purifying box provided with upper and lower tiers for supporting masses of a gas purifying agent and with a plurality of valve ports at each end of the box for permitting gas flow concurrently or successively through said tiers; a gas flow regulating means comprising a valve casing positioned at each end of the purifying box, each valve casing having ports communicating with the purifying box ports, a valve body within each valve casing for controlling the flow through said ports, and means for operating the respective valve bodies; substantially as specified.

5. A gas purifying box having masses of a gas purifying agent, and valve ports combined with gas flow regulating means comprising freely shiftable valve mechanism, slidably engaging said ports, said valve mechanism being adapted to be shifted while the gas is being treated for selectively directing gas flow in various directions relative to said masses to pass through the purifying agent for the purification of the gas; substantially as specified.

6. A gas purifying box having upper and lower masses of a gas purifying agent, combined with gas flow regulating means comprising a freely shiftable valve, said valve being adapted to be moved to different gas flow directing positions while the gas is being treated for selectively directing gas flow successively or concurrently in either direction through the respective masses of purifying agent in the purifying box, substantially as specified.

7. A gas purifying box having a plurality of tiers for supporting masses of a gas purifying agent, combined with gas flow regulating means comprising a freely shiftable valve, said valve being adapted to be moved to different gas flow directing positions while the gas is being treated for selectively directing the gas flow successively or concurrently in either direction through the respective masses of purifying agent in the purifying box; substantially as specified.

8. A gas purifying box having a plurality of tiers for supporting masses of a gas purifying agent and upper, lower and intermediate gas flow passageways, combined with valve guiding means and a freely shiftable valve for selectively directing the gas flow successively or concurrently through said upper, lower and intermediate passageways and thence through said respective masses of purifying agent in the purifying box while the gas is being treated; substantially as specified.

9. In a gas purifying apparatus, in combination: a purifying box provided with spaced tiers for supporting masses of a gas purifying agent, there being gas flow channels above the upper tier, below the lower tier and also between the tiers and ports through the opposite end walls of the purifying box leading respectively to said channels; and valve mechanisms at the respective ends of the purifying box, each valve mechanism comprising a valve casing secured to the end wall of the box, said casing having a port adapted to communicate with a gas main and a vertically-movable slide valve for selectively controlling the flow through the ports in the end wall of the purifying box; substantially as specified.

10. In a gas purifying apparatus, in combination: a purifying box provided with spaced tiers for supporting masses of a gas purifying agent, there being gas flow channels above the upper tier, below the lower tier and also between the tiers and ports through the opposite end walls of the purifying box leading respectively to said channels; and valve mechanisms at the respective ends of the purifying box, each valve mechanism comprising a valve casing secured to the end wall of the box, said casing having a port adapted to communicate with a gas main and a slide valve for selectively controlling the flow through the ports in the end wall of the purifying box; substantially as specified.

11. A gas purifying box having superposed tiers of a gas purifying agent, combined with gas flow regulating means comprising controllable valve mechanism for selectively directing the gas flow in either direction successively or concurrently through said superposed tiers of purifying agent, said valve mechanism being further controllable to direct said concurrent gas flow simultaneously through from between said tiers in varying proportions to compensate for a preponderance of back pressure in one of said tiers.

THOMAS W. STONE.